United States Patent
Saito

(10) Patent No.: US 11,691,538 B2
(45) Date of Patent: Jul. 4, 2023

(54) FUEL CELL SYSTEM

(71) Applicant: TOYOTA JIDOSHA KABUSHIKI KAISHA, Toyota (JP)

(72) Inventor: Hiromu Saito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/456,260

(22) Filed: Nov. 23, 2021

(65) Prior Publication Data

US 2022/0169149 A1  Jun. 2, 2022

(30) Foreign Application Priority Data

Dec. 2, 2020 (JP) .................................. 2020-200262

(51) Int. Cl.
| | |
|---|---|
| *B60L 58/33* | (2019.01) |
| *H01M 8/04701* | (2016.01) |
| *H01M 8/04302* | (2016.01) |
| *H01M 8/04303* | (2016.01) |
| *H01M 8/04225* | (2016.01) |
| *H01M 8/04228* | (2016.01) |
| *B60L 58/34* | (2019.01) |

(52) U.S. Cl.
CPC ......... *B60L 58/33* (2019.02); *H01M 8/04302* (2016.02); *H01M 8/04303* (2016.02); *H01M 8/04708* (2013.01); *H01M 8/04723* (2013.01); *B60L 58/34* (2019.02); *H01M 8/04225* (2016.02); *H01M 8/04228* (2016.02); *H01M 2250/20* (2013.01)

(58) Field of Classification Search
CPC .... B60L 58/33; B60L 58/34; H01M 8/04302; H01M 8/04303; H01M 8/04708; H01M 8/04723; H01M 8/04007; H01M 8/04298; H01M 8/04225; H01M 8/04228; H01M 8/0432; H01M 8/04328; H01M 8/04335; H01M 8/04343; H01M 8/0435; H01M 8/04358; H01M 8/04365; H01M 8/04373; H01M 8/04701; H01M 8/04716; H01M 8/04731; H01M 8/04738; H01M 2250/20
See application file for complete search history.

(56) References Cited

U.S. PATENT DOCUMENTS

2012/0122004 A1* 5/2012 Jeon ..................... H01M 8/0432
  417/32
2012/0247746 A1* 10/2012 Sakajo .............. H01M 8/04701
  165/51

FOREIGN PATENT DOCUMENTS

JP    2015064939 A    4/2015

\* cited by examiner

*Primary Examiner* — Matthew W Van Oudenaren
(74) *Attorney, Agent, or Firm* — Hunton Andrews Kurth LLP

(57) ABSTRACT

A fuel cell system includes a fuel cell and a fuel cell controller. The fuel cell controller is configured to control a cooler based on a command from a host controller, the cooler being configured to cool the fuel cell. When a predetermined condition regarding the fuel cell is satisfied, the fuel cell controller controls the cooler according to a procedure predetermined in the fuel cell controller, regardless of the command from the host controller.

2 Claims, 5 Drawing Sheets

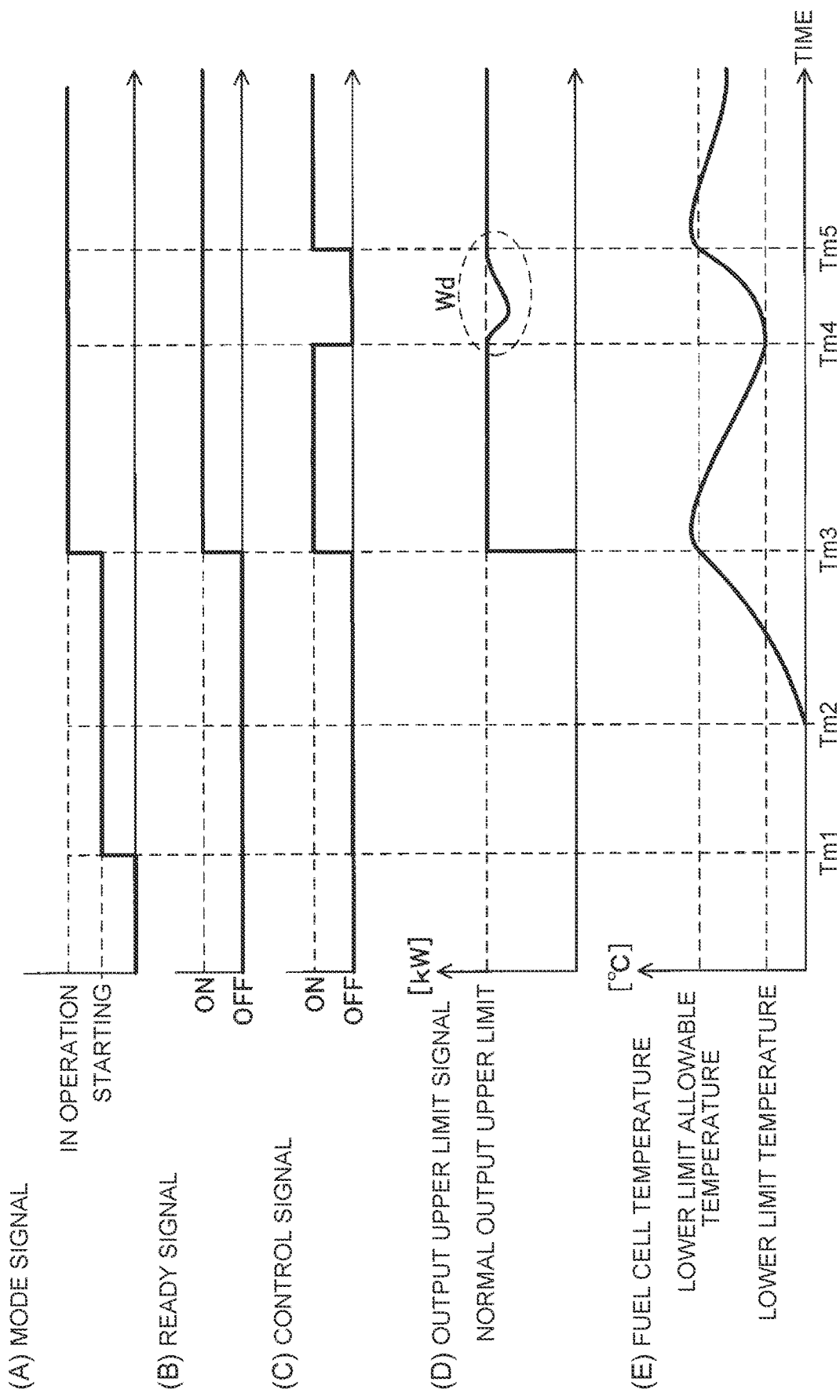

FUEL CELL SYSTEM

CROSS-REFERENCE TO RELATED APPLICATION

This application claims priority to Japanese Patent Application No. 2020-200262 filed on Dec. 2, 2020, incorporated herein by reference in its entirety.

BACKGROUND

1. Technical Field

The technique disclosed herein relates to a fuel cell system.

2. Description of Related Art

Various systems that use a fuel cell instead of a battery as a power source are expected to become widespread in the near future. Batteries and fuel cells are sometimes accompanied by a cooler in order to keep them in a certain temperature range. Fuel cells may require a temperature management procedure specific to the fuel cells. For example, when the temperature of the fuel cell falls below a predetermined lower limit temperature, the power generation efficiency of the fuel cell decreases. Accordingly, when the temperature of the fuel cell falls below the lower limit temperature, the cooling capacity of the cooler is reduced and the fuel cell itself is heated by thermal energy generated by the fuel cell. The process of reducing the cooling capacity and heating the fuel cell itself by the thermal energy of the fuel cell is sometimes called a quick warm-up operation. For example, Japanese Unexamined Patent Application Publication No. 2015-064939 (JP 2015-064939 A) describes a quick warm-up operation. The quick warm-up operation also reduces the power generation efficiency. However, the power generation efficiency of the fuel cell recovers quickly when the fuel cell is heated to an appropriate temperature by the quick warm-up operation.

SUMMARY

When constructing a system using a fuel cell, it is troublesome to incorporate a process specific to the fuel cell (e.g., the quick warm-up operation described above) into a host controller that controls the entire system. The specification provides a fuel cell system that is easy to handle for a controller (host controller) of a host system including a fuel cell system.

An aspect of a fuel cell system disclosed in the specification includes a fuel cell and a fuel cell controller. The fuel cell controller controls a cooler based on a command from a host controller, the cooler being configured to cool the fuel cell. The fuel cell controller is configured to, when a predetermined condition regarding the fuel cell is satisfied, control the cooler according to a procedure predetermined in the fuel cell controller, regardless of the command from the host controller.

Hereinafter, a system incorporating a fuel cell system as a power source will be referred to as an overall system. A controller (host controller) of the overall system obtains electric power from the fuel cell system and uses the electric power to drive other devices of the overall system. The overall system includes a cooler for cooling the fuel cell. Normally, the host controller controls the cooler so that the temperature of the fuel cell falls within a predetermined temperature range. When thermal energy generated by the fuel cell is to be used to raise the temperature of other devices (or a user's room), the host controller may control the cooler so that the temperature of the fuel cell becomes relatively high. The fuel cell controller normally controls the cooler based on a command from the host controller. However, when a condition that requires a process specific to the fuel cell is satisfied, the fuel cell controller controls the cooler according to a procedure predetermined in the fuel cell controller, regardless of the command from the host controller. Since the fuel cell controller determines and performs the process specific to the fuel cell, it is not necessary to incorporate the process specific to the fuel cell into the host controller. The fuel cell system disclosed in the specification is easy to handle for the controller (host controller) of the system (overall system) including the fuel cell system.

In the fuel cell system of the above aspect, an example of the predetermined condition is a condition regarding the temperature of the fuel cell. An example of the predetermined procedure is as follows. The fuel cell controller may be configured to, when the temperature of the fuel cell falls below a predetermined lower limit temperature, operate the cooler with minimum cooling capacity until the temperature of the fuel cell reaches a predetermined lower limit allowable temperature, regardless of the command from the host controller. The lower limit allowable temperature is higher than the lower limit temperature. The "minimum cooling capacity" also includes stopping the cooler. This procedure is equivalent to the quick warm-up operation described above. That is, when the temperature of the fuel cell falls below the predetermined lower limit temperature, the fuel cell controller performs the quick warm-up operation regardless of the command from the host controller. There is no need to incorporate a process for the quick warm-up operation into the host controller.

In the fuel cell system of the above aspect, the predetermined condition may be a condition regarding the temperature of the fuel cell. The fuel cell controller may be configured to, when the temperature of the fuel cell becomes higher than a predetermined upper limit temperature, operate the cooler with maximum cooling capacity regardless of the command from the host controller.

In the fuel cell system of the above aspect, the predetermined condition may be a condition that the fuel cell controller receives a start command for the fuel cell from the host controller. The fuel cell controller may be configured to, upon receiving the start command, perform a predetermined start process for the fuel cell regardless of the subsequent command for the cooler from the host controller.

In the fuel cell system of the above aspect, the predetermined condition may be a condition that the fuel cell controller receives a stop command for the fuel cell from the host controller. The fuel cell controller may be configured to, upon receiving the stop command, perform a predetermined stop process for the fuel cell regardless of the subsequent command for the cooler from the host controller.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is an example of a timing chart of signals that are sent from the FC controller.

DETAILED DESCRIPTION OF EMBODIMENTS

Figure 1:
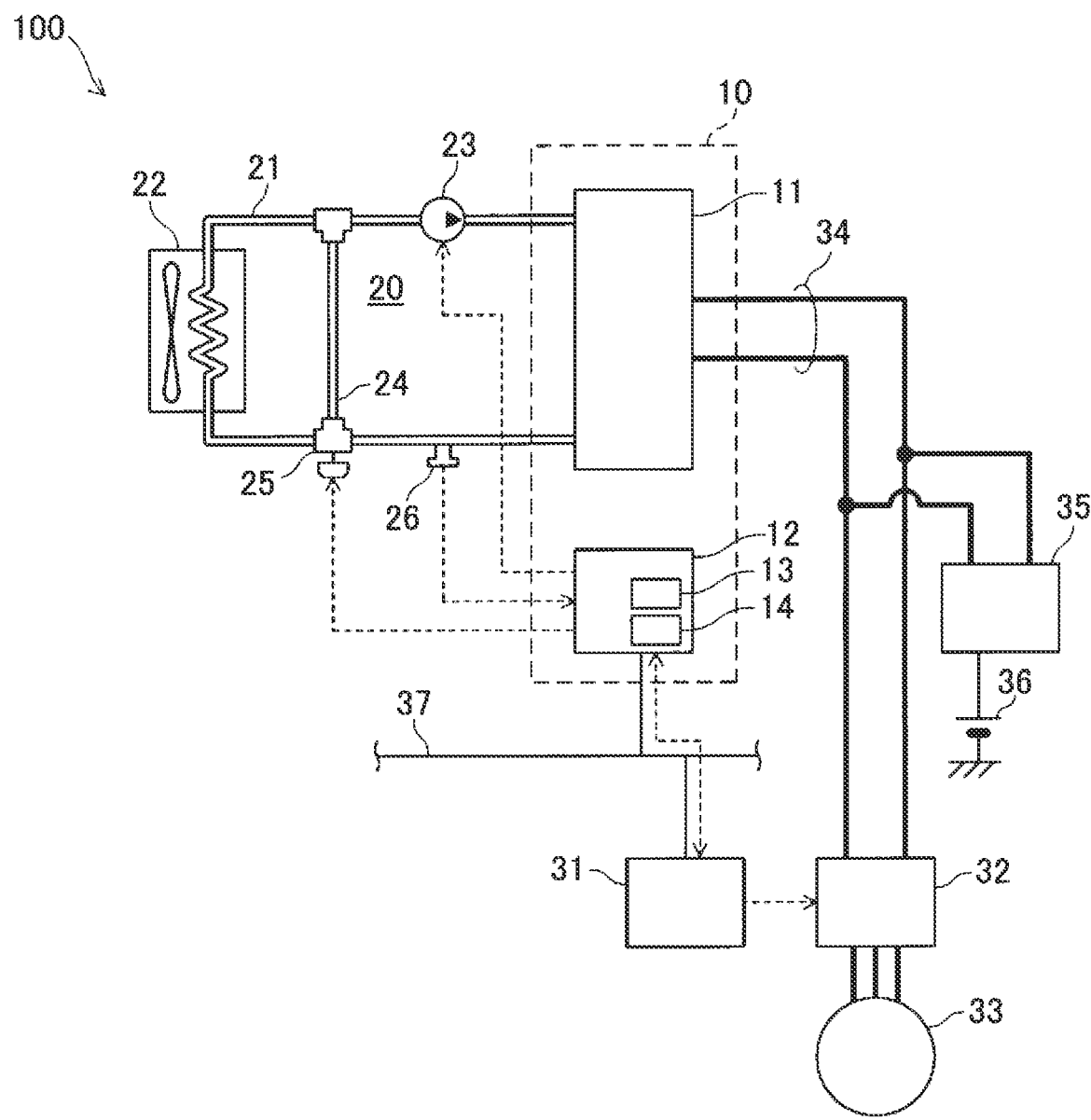
FIG. 1 is a block diagram of an automobile including a fuel cell system of an embodiment.

A fuel cell system 10 of an embodiment will be described with reference to the drawings. The fuel cell system 10 is incorporated in an automobile 100. The automobile 100 includes a traction motor 33. The fuel cell system 10 supplies electric power to the motor 33 of the automobile 100 and other devices of the automobile 100. The automobile 100 is an example of an overall system including the fuel cell system 10. In FIG. 1, dashed arrows represent the flow of signals.

Regarding the fuel cell system 10, only a fuel cell 11 (fuel cell stack) and a fuel cell controller 12 are shown in FIG. 1, and a fuel tank, a device for supplying fuel, a device for supplying oxygen, etc. are not shown in FIG. 1. Regarding the automobile 100, devices other than a cooler 20, a host controller 31, a power converter 32, the motor 33, a buck converter 35, and a battery 36 are not shown in FIG. 1. Hereinafter, the "fuel cell controller 12" will be referred to as the "FC controller 12" for simplicity.

Output power of the fuel cell 11 is sent to the power converter 32 via a power line 34. The power converter 32 converts the output power (direct current (DC) power) of the fuel cell 11 to driving power (alternating current (AC) power) for the motor 33. The buck converter 35 is connected to the power line 34. The buck converter 35 steps down the voltage of the output power of the fuel cell 11 and supplies the resultant power to the battery 36. The output power of the fuel cell 11 is supplied to other devices of the automobile 100 via the battery 36.

The devices (including the fuel cell system 10) included in the automobile 100 are controlled by the host controller 31. The host controller 31 (i.e., controller for the automobile 100) determines desired torque of the motor 33 from the accelerator operation amount and the speed of the automobile 100. The host controller 31 controls the power converter 32 so that the determined desired torque is achieved. The host controller 31 informs the FC controller 12 of desired output power of the fuel cell 11 so that the fuel cell 11 outputs enough electric power to achieve the desired torque. The FC controller 12 and the host controller 31 communicate with each other via a network 37.

Since the fuel cell 11 generates a large amount of heat, the automobile 100 includes the cooler 20 for cooling the fuel cell 11. The cooler 20 includes a circulation path 21 for circulating a cooling medium between the fuel cell 11 and a radiator 22, a pump 23 for circulating the cooling medium, a bypass path 24 connecting the upstream and downstream sides of the circulation path 21 so as to bypass the radiator 22, a flow rate regulator valve 25, and a temperature sensor 26. The flow rate regulator valve 25 distributes the cooling medium having passed through the fuel cell 11 to the radiator 22 and the bypass path 24. The flow rate regulator valve 25 and the pump 23 are controlled by the FC controller 12. The FC controller 12 also controls the output of the fuel cell 11 in response to commands from the host controller 31.

The FC controller 12 includes a central processing unit (CPU 13) and a memory 14. A program to be executed by the CPU 13 is stored in the memory 14. When the CPU 13 executes the program stored in the memory 14, the CPU 13 functions as the FC controller 12 that controls the cooler 20 and the fuel cell 11.

The cooling capacity (ability to cool the fuel cell 11) of the cooler 20 is adjusted by the output of the pump 23 and the position of the flow rate regulator valve 25 (valve position). The flow rate regulator valve 25 distributes the cooling medium having passed through the fuel cell 11 to the radiator 22 and the bypass path 24. The ratio between the amount of cooling medium flowing through the radiator 22 and the amount of cooling medium flowing through the bypass path 24 can be adjusted by the valve position. The cooling capacity is increased by increasing the amount of cooling medium flowing through the radiator 22. The maximum cooling capacity is obtained by controlling the position of the flow rate regulator valve 25 so that all the cooling medium flows through the radiator 22 and operating the pump 23 at maximum output. The cooling capacity is minimized by controlling the position of the flow rate regulator valve 25 so that all the cooling medium bypasses the radiator 22 and flows through the bypass path 24 and operating the pump 23 at minimum output (or stopping the pump 23).

The cooler 20 includes the temperature sensor 26 for measuring the temperature of the cooling medium flowing through the circulation path 21. The temperature sensor 26 is disposed near a cooling medium outlet of the fuel cell 11. The temperature of the cooling medium measured by the temperature sensor 26 is used as the temperature of the fuel cell 11. Measurement data of the temperature sensor 26 is sent to the FC controller 12, and the FC controller 12 sends the measurement data of the temperature sensor 26 to the host controller 31. The host controller 31 determines a desired position of the flow rate regulator valve 25 and desired output of the pump 23 based on the measurement data of the temperature sensor 26 (i.e., the temperature of the fuel cell 11) so that the temperature of the fuel cell 11 is kept within a predetermined temperature range. When the heat of the fuel cell 11 is used to heat a vehicle cabin, the host controller 31 adjusts the temperature of the fuel cell 11 to a relatively high temperature. The host controller 31 thus adjusts the temperature (temperature range) of the fuel cell 11 according to the condition of each part of the automobile 100.

The FC controller 12 controls the cooler 20 in response to commands from the host controller 31. The FC controller 12 controls the pump 23 and the flow rate regulator valve 25 according to the received commands (desired position and desired output). However, when a predetermined condition is satisfied, the FC controller 12 controls the cooler 20 according to a procedure predetermined for the FC controller 12, regardless of the commands from the host controller 31. The predetermined procedure is stored in the memory 14 of the FC controller 12.

Various commands are sent from the host controller 31 to the FC controller 12 via the network 37. Various signals are sent from the FC controller 12 to the host controller 31 via the network 37. The signals that are sent from the FC controller 12 to the host controller 31 include a mode signal, a Ready signal, a control signal, a temperature signal, and an output upper limit signal. The mode signal is a signal indicating the state of the fuel cell system 10. The Ready signal is a signal informing the host controller 31 that the output of the fuel cell 11 is available. The control signal is a signal indicating whether the cooler 20 is controlled according to commands from the host controller 31 or the cooler 20 is controlled according to the procedure stored in the FC controller 12 regardless of the commands from the host controller 31. The temperature signal is a signal informing the host controller 31 of the measurement data of the temperature sensor 26 (i.e., the temperature of the fuel cell 11). The output upper limit signal is a signal informing the host controller 31 of an upper limit value of the output of the fuel cell 11.

Figure 2:
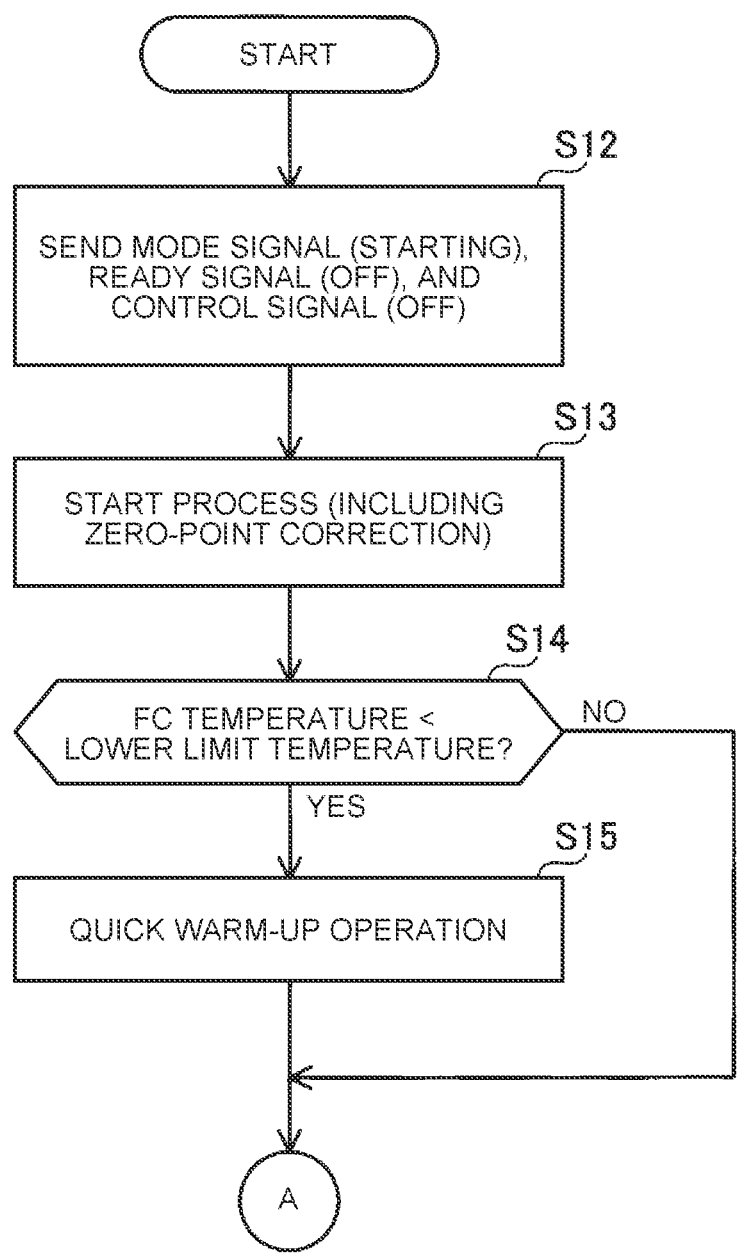
FIG. 2 is a flowchart (1) of a process of a fuel cell controller (FC controller)
Figure 3:
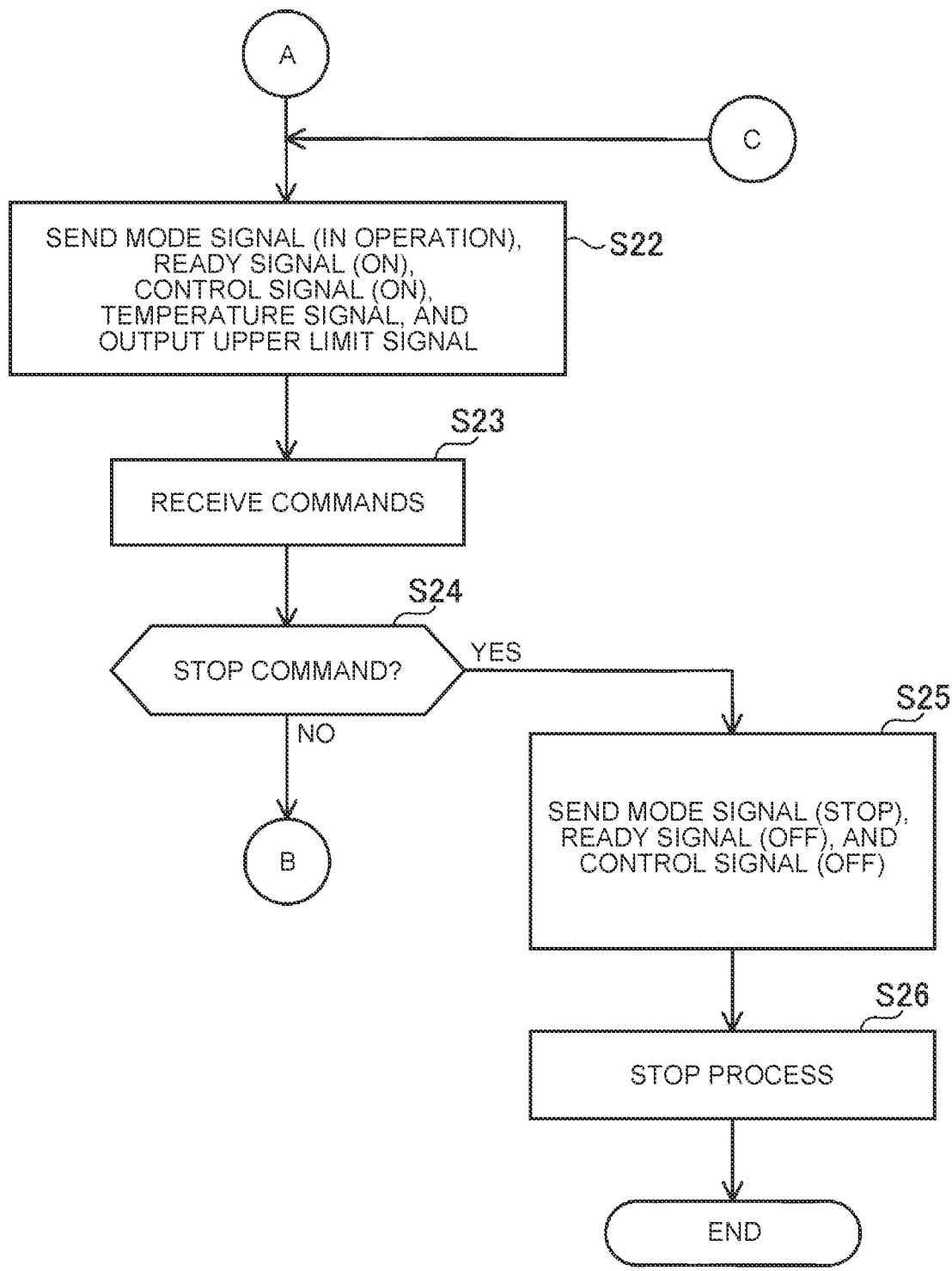
FIG. 3 is a flowchart (2) of the process of the FC controller.
Figure 4:
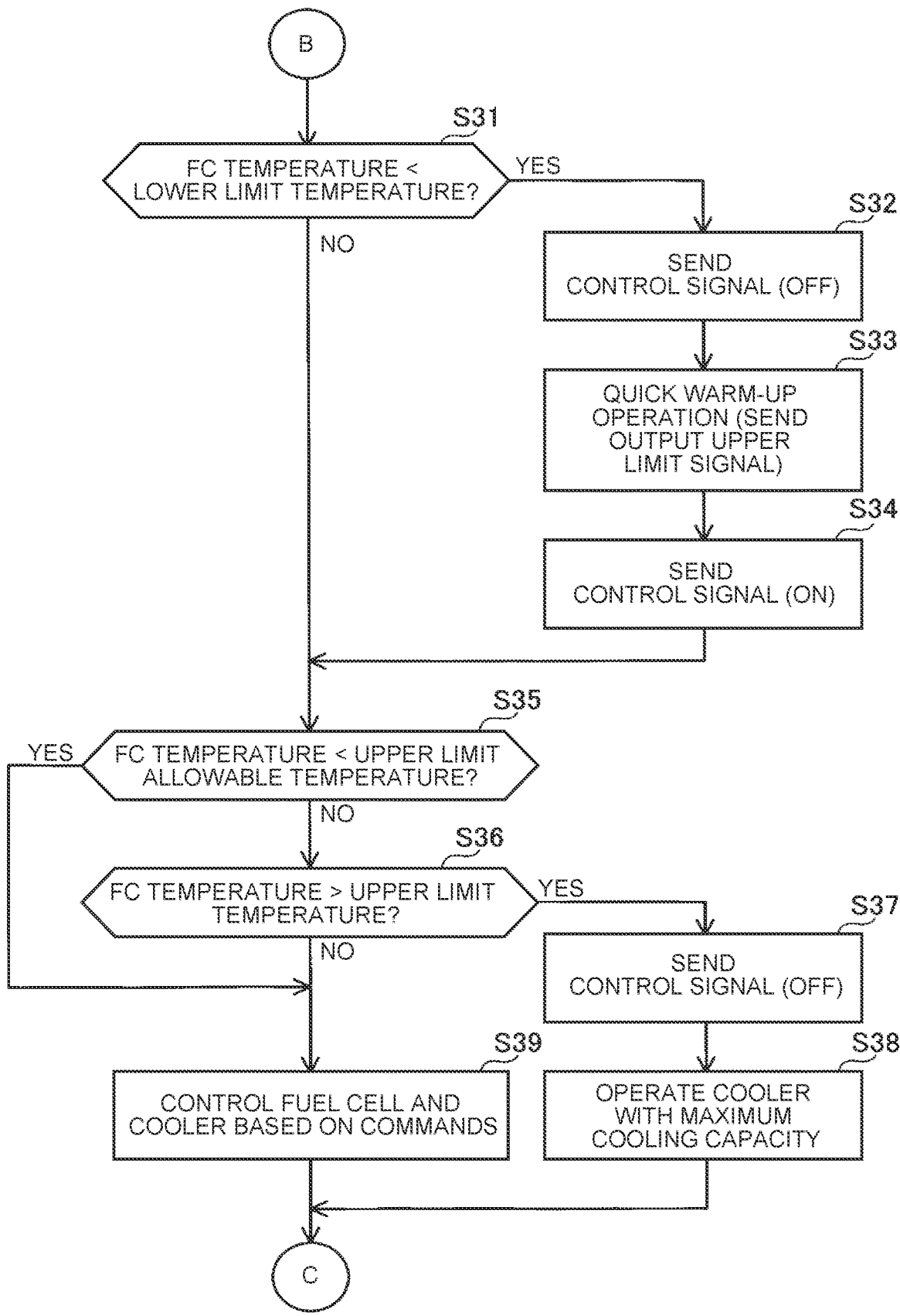
FIG. 4 is a flowchart (3) of the process of the FC controller.

A flowchart of a process that is performed by the FC controller 12 is shown in FIGS. 2 to 4. The process of FIGS. 2 to 4 is started when the FC controller 12 receives a start command from the host controller 31.

The process that is performed by the FC controller 12 will be described with reference to FIGS. 2 to 4. When the FC controller 12 receives a start command from the host controller 31, the FC controller 12 first sends a mode signal, a Ready signal, and a control signal to the host controller 31 (step S12). At this time, the mode signal has a parameter set to "starting." The Ready signal has a parameter set to "OFF." The control signal also has a parameter set to "OFF." The mode signal with its parameter set to "starting" is a signal informing the host controller 31 that the fuel cell system 10 is starting. The Ready signal with its parameter set to "OFF" is a signal informing the host controller 31 that the output of the fuel cell 11 is unavailable. The control signal with its parameter set to "OFF" is a signal informing the host controller 31 that the FC controller 12 is controlling the cooler 20 according to the predetermined procedure and does not accept any commands for the cooler 20 and the fuel cell 11 from the host controller 31.

Next, the FC controller 12 performs a start process (step S13). The start process is a preparatory process required to start power generation in the fuel cell 11. For example, the start process includes opening a valve for a hydrogen tank, not shown, and starting an air compressor, not shown, for sending air to the fuel cell 11.

The start process also includes zero-point correction for the flow rate regulator valve 25 of the cooler 20. The zero-point correction for the flow rate regulator valve 25 is a process of moving the valve position to the limit so that all the cooling medium flows to the radiator 22, and then gradually moving the valve position to update the zero point with a new zero point, namely the position where the cooling medium starts flowing into the bypass path 24.

Even when the FC controller 12 receives commands specifying the cooling capacity (desired position of the flow rate regulator valve 25 and desired output of the pump 23) from the host controller 31 while performing the start process including the zero-point correction, the FC controller 12 ignores the commands. That is, the FC controller 12 performs the predetermined start process regardless of the commands from the host controller 31.

When the start process is completed, the FC controller 12 then compares the temperature of the fuel cell 11 with a lower limit temperature (step S14). In step S14 of FIG. 2, the "FC temperature" means the temperature of the fuel cell 11. The "FC temperature" in FIG. 4 has the same meaning.

As described above, the temperature measured by the temperature sensor 26 is regarded as the temperature of the fuel cell 11. The lower limit temperature is a constant included in advance in the program of the FC controller 12. When the temperature of the fuel cell 11 falls below the lower limit temperature, the power generation efficiency of the fuel cell 11 decreases significantly. Therefore, when the temperature of the fuel cell 11 is below the lower limit temperature, the FC controller 12 performs a quick warm-up operation (step S14: YES, step S15).

The quick warm-up operation means that the FC controller 12 operates the cooler 20 with minimum cooling capacity. Specifically, the FC controller 12 performs the following process. The FC controller 12 adjusts the position of the flow rate regulator valve 25 so that all the cooling medium bypasses the radiator 22. At the same time, the FC controller 12 operates the pump 23 at minimum output (or stops the pump 23). The FC controller 12 also reduces the amount of air that is supplied to the fuel cell 11. When the amount of air that is supplied to the fuel cell 11 is reduced, the power generation efficiency decreases, but thermal energy that is generated by the fuel cell 11 increases. In the quick warm-up operation, the temperature of the fuel cell 11 is quickly raised by increasing the thermal energy that is generated by the fuel cell 11 and controlling the cooler 20 so as to minimize the cooling capacity.

The FC controller 12 ignores commands from the host controller 31 during the quick warm-up operation. That is, when the temperature of the fuel cell 11 is below the lower limit temperature, the FC controller 12 performs the predetermined quick warm-up operation (operates the cooler 20 with minimum cooling capacity) regardless of the commands from the host controller 31.

The FC controller 12 monitors the temperature of the fuel cell 11 even during the quick warm-up operation. When the temperature of the fuel cell 11 becomes higher than a predetermined lower limit allowable temperature, the FC controller 12 ends the quick warm-up operation. The lower limit allowable temperature is a temperature higher than the lower limit temperature described above, and is a threshold temperature for preventing hunting of the quick warm-up operation. Hunting means that a specific process is frequently and repeatedly started and stopped.

When the temperature of the fuel cell 11 is not below the lower limit temperature in the determination process of step S14 (step S14: NO), the FC controller 12 skips step S15 (i.e., quick warm-up operation).

The process of FIGS. 3 and 4 is repeatedly performed after the start process is finished. The FC controller 12 sends a mode signal, a Ready signal, a control signal, a temperature signal, and an output upper limit signal to the host controller 31 (step S22). At this time, the mode signal has a parameter set to "in operation." The Ready signal has a parameter set to "ON." The control signal has a parameter set to "ON." The mode signal with its parameter set to "in operation" is a signal informing the host controller 31 that the fuel cell system 10 is in operation. The Ready signal with its parameter set to "ON" is a signal informing the host controller 31 that the output of the fuel cell 11 is available. The control signal with its parameter set to "ON" is a signal informing the host controller 31 that the FC controller 12 controls the cooler 20 and the fuel cell 11 based on commands from the host controller 31. When the host controller 31 receives the Ready signal with its parameter set to "ON," the host controller 31 determines that the output of the fuel cell 11 is available, and starts the power converter 32 and the buck converter 35. When the host controller 31 receives the control signal with its parameter set to "ON," the host controller 31 sends commands specifying the cooling capacity of the cooler 20 according to the temperature of the fuel cell 11 (desired position of the flow rate regulator valve 25 and desired output of the pump 23) to the FC controller 12.

The temperature signal includes measurement data of the temperature sensor 26 (i.e., the temperature of the fuel cell 11). The output upper limit signal includes the value of maximum power that can be output by the fuel cell 11.

Subsequently, the FC controller 12 receives commands from the host controller 31 (step S23). When the commands from the host controller 31 include a stop command (step S24: YES), the FC controller 12 sends a mode signal, a Ready signal, and a control signal to the host controller 31 (step S25) and performs a predetermined stop process (step S26), and the routine is ended. The mode signal that is sent in step S25 has a parameter set to "stop," and both the Ready signal and the control signal that are sent in step S25 have a parameter set to "OFF."

The stop process includes closing the valve for the hydrogen tank, draining water from the fuel cell 11, etc. The zero-point correction included in the start process of step S13 may be made in the stop process rather than in the start process. When the zero-point correction is made in the stop process, it is not necessary to make the zero-point correction next time the fuel cell system 10 is started. Making the zero-point correction in the stop process can thus reduce the time required for the start process. During the stop process, the FC controller 12 does not accept any commands for the cooler 20 from the host controller 31. That is, after receiving the stop command from the host controller 31, the FC controller 12 performs the stop process regardless of the subsequent commands for the cooler 20 from the host controller 31.

The commands received in step S23 include commands specifying the cooling capacity of the cooler 20 (desired valve position of the flow rate regulator valve 25 and desired output of the pump 23) and desired output of the fuel cell 11. Normally, the FC controller 12 controls the cooler 20 based on the commands for the cooling capacity received from the host controller 31, and controls the fuel cell 11 based on the desired output of the fuel cell 11 (step S39 that will be described later). However, when the temperature of the fuel cell 11 is below the lower limit temperature (step S31: YES) and when the temperature of the fuel cell 11 is above the upper limit temperature (step S36: YES), the FC controller 12 performs a process predetermined in the FC controller 12, regardless of the commands from the host controller 31.

When the temperature of the fuel cell 11 is below the lower limit temperature, the FC controller 12 sends a control signal with its parameter set to "OFF" to the host controller 31 and performs a quick warm-up operation. When the quick warm-up operation is finished, the FC controller 12 sends a control signal with its parameter set to "ON" to the host controller 31 (step S31: YES, steps S32, S33, S34). The control signal with its parameter set to "OFF" means that the FC controller 12 controls the cooler 20 according to the predetermined procedure regardless of the commands from the host controller 31.

The quick warm-up operation is as described above. However, the Ready signal is kept "ON" during the quick warm-up operation in step S33. That is, the host controller 31 can use the output of the fuel cell 11 even during the quick warm-up operation in step S33. As described above, in the quick warm-up operation, the FC controller 12 reduces the amount of air that is supplied to the fuel cell 11. Therefore, the power generation efficiency decreases, and the maximum output of the fuel cell 11 decreases. During the quick warm-up operation in step S33, the FC controller 12 sets the output upper limit signal to the output upper limit of the fuel cell 11 and sends the resultant output upper limit signal to the host controller 31.

As described above, the FC controller 12 ends the quick warm-up operation when the temperature of the fuel cell 11 becomes higher than the predetermined lower limit allowable temperature.

When the temperature of the fuel cell 11 is above the upper limit temperature, the FC controller 12 sends a control signal with its parameter set to "OFF" to the host controller 31 and operates the cooler 20 with maximum cooling capacity (Step S35: NO, S36: YES, steps S37, S38). While the temperature of the fuel cell 11 is above the upper limit temperature and the FC controller 12 is operating the cooler 20 with maximum cooling capacity, the FC controller 12 ignores commands specifying the cooling capacity even when the FC controller 12 receives such commands from the host controller 31. In other words, while the temperature of the fuel cell 11 is above the upper limit temperature, the FC controller 12 controls the cooler 20 according to the predetermined procedure (maximum cooling capacity) regardless of the commands sent from the host controller 31.

When the temperature of the fuel cell 11 is below an upper limit allowable temperature (step S35: YES), the determination process of step S36 is skipped, and the FC controller 12 proceeds with the process to step S39. The upper limit allowable temperature is set to a value lower than the upper limit temperature. Step S35 is provided in order to prevent hunting of steps S37 and S38.

When the temperature of the fuel cell 11 is neither below the lower limit temperature (step S31: NO) nor above the upper limit temperature (step S36: NO), the FC controller 12 controls the cooler 20 and the fuel cell 11 based on the commands from the host controller 31 (step S39).

After the FC controller 12 performs step S38 or S39, the FC controller 12 repeats step S22 and the subsequent steps of FIG. 3 until it receives a stop command from the host controller 31.

FIG. 5 shows an example of a timing chart of various signals that are sent from the FC controller 12. Specifically, FIG. 5 shows an example of a timing chart of (A) mode signal, (B) Ready signal, (C) control signal, and (D) output upper limit signal. FIG. 5 also shows (E) fuel cell temperature.

At time Tm1, a start command is sent from the host controller 31 to the FC controller 12. At time Tm1, the FC controller 12 sends a mode signal with its parameter set to "starting," a Ready signal with its parameter set to "OFF," and a control signal with its parameter set to "OFF" to the host controller 31 (step S12 in FIG. 2).

The start process of step S13 ends at time Tm2. Next, the FC controller 12 checks the temperature of the fuel cell 11 (step S14). In the example of FIG. 5, the temperature of the fuel cell 11 is below the lower limit temperature at time Tm2. The FC controller 12 therefore starts a quick warm-up operation (step S15).

The temperature of the fuel cell 11 increases due to the quick warm-up operation. The temperature of the fuel cell 11 becomes higher than the lower limit allowable temperature at time Tm3. The FC controller 12 ends the quick warm-up operation at time Tm3, and sends to the host controller 31 a mode signal with its parameter set to "in operation," a Ready signal with its parameter set to "ON," a control signal with its parameter set to "ON," a temperature signal indicating the temperature of the fuel cell 11, and an output upper limit signal set to the output upper limit of the fuel cell 11 (step S22). The output upper limit signal that is output at time Tm3 is set to a normal output upper limit. The "normal output upper limit" means an output upper limit when the fuel cell 11 is operating normally.

In the example of FIG. 5, the temperature of the fuel cell 11 gradually decreases after time Tm3. The temperature of the fuel cell 11 falls below the lower limit temperature at time Tm4. The FC controller 12 sends a control signal with its parameter set to "OFF" to the host controller 31 and starts a quick warm-up operation (steps S32, S33). As described above, the power generation efficiency of the fuel cell 11 decreases when the quick warm-up operation is performed. During the quick warm-up operation, the FC controller 12 sends an output upper limit signal specifying an output upper limit lower than the normal output upper limit (see an area Wd surrounded by dashed line in FIG. 5).

The temperature of the fuel cell 11 becomes higher than the lower limit allowable temperature at time Tm5. The FC controller 12 ends the quick warm-up operation and sends a control signal with its parameter set to "ON" to the host controller 31 (step S34). Since the quick warm-up operation is ended, the output upper limit is also returned to the normal output upper limit after time Tm5.

Advantages of the fuel cell system 10 described in the embodiment will be described. The fuel cell system 10 of the embodiment is incorporated in the automobile 100. The automobile 100 includes the cooler 20 for cooling the fuel cell 11. The controller (FC controller 12) of the fuel cell system 10 normally controls the cooler 20 based on the commands from the controller (host controller 31) of the automobile 100. However, when the predetermined condition regarding the fuel cell 11 is satisfied, the FC controller 12 controls the cooler 20 according to the predetermined procedure regardless of the commands from the host controller 31 (commands for the cooling capacity).

An example of the predetermined condition is a condition regarding the temperature of the fuel cell 11. Typically, the predetermined condition is a condition that the temperature of the fuel cell 11 is below the lower limit temperature. When the temperature of the fuel cell 11 falls below the lower limit temperature, the FC controller 12 performs a predetermined quick warm-up operation regardless of the commands from the host controller 31.

Another example of the predetermined condition is a condition that the temperature of the fuel cell 11 is above the upper limit temperature. When the temperature of the fuel cell 11 becomes higher than the upper limit temperature, the FC controller 12 controls the cooler 20 according to the predetermined procedure regardless of the commands from the host controller 31. That is, the FC controller 12 controls the cooler 20 so that the maximum cooling capacity is achieved.

A further example of the predetermined condition is a condition that the FC controller 12 receives a start command or a stop command for the fuel cell 11 from the host controller 31. When the FC controller 12 receives a start command, the FC controller 12 performs the predetermined start process regardless of the subsequent commands from the host controller 31. After the start process is finished, the FC controller 12 accepts commands from the host controller 31 again.

When the FC controller 12 receives a stop command, the FC controller 12 performs the predetermined stop process regardless of the subsequent commands from the host controller 31. After the stop process is finished, the FC controller 12 accepts commands from the host controller 31 again (in this case, only a start command).

The quick warm-up operation etc. is control specific to the fuel cell 11. The host controller 31 can thus use the fuel cell system 10 without being involved in the process specific to the fuel cell 11. The processing of the host controller 31 therefore does not become complicated. In other words, the fuel cell system 10 of the embodiment is easy to handle for a controller of a host system (host controller 31).

For example, a manufacturer who purchases a fuel cell system and manufactures its own system (e.g., a fuel cell vehicle) need only incorporate a temperature management process similar to a temperature management process for a battery into a controller of the system manufactured by the manufacturer.

Points to be noted regarding the technique described in the embodiment will be described. The fuel cell system 10 of the embodiment can also be incorporated into a host system other than an automobile.

Although specific examples of the disclosure are described in detail above, the examples are merely illustrative and are not intended to limit the scope of claims. The technique described in the claims includes various modifications and variations of the specific examples described above. The technical elements described in the specification or drawings have technical usefulness alone or in various combinations, and are not limited to the combinations described in the claims as originally filed. The technique illustrated in the specification or drawings can achieve a plurality of objects at the same time, and achieving one of the objects itself has technical usefulness.

What is claimed is:

1. A fuel cell system, comprising:
a fuel cell; and
a fuel cell controller programmed to control a cooler based on a command from a host controller, the cooler being configured to cool the fuel cell, wherein
the host controller is a controller of an overall system including the fuel cell system, and
the fuel cell controller is programmed to, when a predetermined condition regarding the fuel cell is satisfied, control the cooler according to a procedure predetermined in the fuel cell controller, regardless of the command from the host controller, wherein
the predetermined condition is a condition that the fuel cell controller receives a start command for the fuel cell from the host controller; and
the fuel cell controller is programmed to, upon receiving the start command, perform a predetermined start process for the fuel cell regardless of a command for the cooler from the host controller after the start command.

2. A fuel cell system, comprising:
a fuel cell; and
a fuel cell controller programmed to control a cooler based on a command from a host controller, the cooler being configured to cool the fuel cell, wherein
the host controller is a controller of an overall system including the fuel cell system, and
the fuel cell controller is programmed to, when a predetermined condition regarding the fuel cell is satisfied, control the cooler according to a procedure predetermined in the fuel cell controller, regardless of the command from the host controller, wherein:
the predetermined condition is a condition that the fuel cell controller receives a stop command for the fuel cell from the host controller; and
the fuel cell controller is programmed to, upon receiving the stop command, perform a predetermined stop process for the fuel cell regardless of a command for the cooler from the host controller after the stop command.

* * * * *